(12) United States Patent
Jacob (10) Patent No.: US 9,181,134 B1
(45) Date of Patent: Nov. 10, 2015

(54) PROCESS OF CONVERTING TEXTILE SOLID WASTE INTO GRAPHITE SIMPLE OR COMPLEX SHAPED MANUFACTURE

(75) Inventor: David Jacob, Haifa (IL)

(73) Assignee: ISRAZION LTD., Haifa (IL)

( * ) Notice: Subject to any disclaimer, the term of this patent is extended or adjusted under 35 U.S.C. 154(b) by 645 days.

(21) Appl. No.: 13/427,844

(22) Filed: Mar. 22, 2012

Related U.S. Application Data (60) Provisional application No. 61/479,819, filed on Apr. 27, 2011.

(51) Int. Cl.
*C04B 35/524* (2006.01)
*B22F 3/15* (2006.01)

(52) U.S. Cl.
CPC ............. *C04B 35/524* (2013.01); *B22F 3/15* (2013.01)

(58) Field of Classification Search
CPC .......... B22F 3/12; B22F 2302/40; B22F 3/04; B22F 3/15; C03B 19/06; C03B 19/063; C04B 35/524
USPC ...................... 264/29.4, 29.6, 29.7
See application file for complete search history.

(56) References Cited

U.S. PATENT DOCUMENTS

| | | | |
|---|---|---|---|
| 3,116,975 A | | 1/1964 | Cross |
| 3,212,930 A | * | 10/1965 | Thompson et al. ........... 427/115 |
| 3,333,926 A | | 8/1967 | Moyer |
| 3,337,301 A | * | 8/1967 | McWhorter et al. ....... 423/447.7 |
| 3,914,395 A | * | 10/1975 | Finelli et al. ................. 423/448 |
| 4,051,657 A | | 10/1977 | Spies |
| 4,051,659 A | | 10/1977 | Blakelock |
| 4,112,059 A | | 9/1978 | DiEdwardo |
| 4,237,108 A | | 12/1980 | Fukuhara |
| 4,350,672 A | * | 9/1982 | Layden et al. ............ 423/445 R |
| 4,571,317 A | | 2/1986 | Layden |
| 5,047,453 A | | 9/1991 | Vost |
| 5,595,839 A | * | 1/1997 | Hossain ........................ 429/210 |
| 6,077,463 A | | 6/2000 | Takai |
| 6,783,747 B1 | | 8/2004 | Sudo et al. |
| 7,597,999 B2 | | 10/2009 | Mao et al. |
| 7,634,840 B2 | | 12/2009 | Kobayashi et al. |
| 7,708,214 B2 | | 5/2010 | Medoff |
| 7,708,805 B2 | | 5/2010 | Heine et al. |
| 7,879,271 B2 | | 2/2011 | Olry et al. |
| 2002/0003004 A1 | | 1/2002 | Guckert et al. |
| 2003/0027471 A1 | | 2/2003 | Shimazaki et al. |

(Continued)

FOREIGN PATENT DOCUMENTS

WO WO 2010/090164 * 8/2010

OTHER PUBLICATIONS

Hoshii, S., A. Kojima, M. Goto, Rapid baking of graphite powders by the spark plasma sintering method, Letters to the editor, Carbon, vol. 38 (2000) pp. 1879-1902.*

(Continued)

*Primary Examiner* — Matthew Daniels
(74) *Attorney, Agent, or Firm* — Hauptman Ham, LLP (57) ABSTRACT

This description concerns a process of converting textile solid waste into a graphite manufacture and makes it possible both to reduce or totally eliminate the use of virgin textile materials for graphitization and to prepare graphite manufacture, such as simple articles (e.g., fibers, powder, foil, sheets, etc.) and complex shape articles (e.g., blocks, plates, rings, pipes, armors, etc.). Described is a sustainable textile solid waste material management process.

17 Claims, 7 Drawing Sheets

(56) References Cited

U.S. PATENT DOCUMENTS

| | | |
|---|---|---|
| 2008/0143005 A1 | 6/2008 | Lim et al. |
| 2010/0032049 A1 | 2/2010 | Wadahara et al. |
| 2010/0178232 A1 | 7/2010 | Pol |
| 2011/0294036 A1* | 12/2011 | Sumioka et al. ............... 429/482 |

OTHER PUBLICATIONS

Chen, W., U. Anselmi-Tamburini, J.E. Garay, J.R. Groza, Z.A. Munir, Fundamental investigations on the spark/plasma sintering/synthesis process: I. Effect of dc pulsing on reactivity, Materials Science and Engineering A, vol. 394 (2005), pp. 132-138).*

X. Huang, Fabrication and Properties of Carbon Fibers, Fabrication Materials (Dec. 16, 2009) vol. 2, pp. 2369-2403.

David Yaakov, et al., On the Study of Electrolyte Solutions for Li-Ion Batteries That Can Work Over a Wide Temperature Range, Journal of The Electrochemical Society, (Nov. 5, 2010) 157 (12) A1383-A1391.

Jaakko Kooroshy, et al., Critical Materials for Green Energy, Metal Bulletin Ltd (Sep. 2011) Industrial Minerals, ISSN 00 19-8544.

Morinobu Endo, et al., Development and Application of Carbon Nanotubes, AAPPS Bulletin February (Feb. 2008) vol. 18, No. 1, pp. 3-11.

Ran Elazari et al., Sulfur-Impregnated Activated Carbon Fiber Cloth as a Binder-Free Cathode for Rechargeable Li-S Batteries, Adv. Mater. (Nov. 4, 2011) 23, 5641-5644.

R. Kirchner, "Fast"—Field assisted sintering technology basics, state of the art and future aspects, FCT Systeme GmbH, Rauenstein, Germany (Mar. 2011).

Daniela Fredrick, Thermal Technology PECS/FAST/SPS, Thermal Technology LLC, International Spring School on Fast. Rauenstein, Germany (Mar. 2011).

Y. Zhang et al., Composite anode material of silicon/graphite/carbon nanotubes for Li-ion batteries, Electrochimica Acta 51 (Mar. 6, 2006) 4994-5000.

Shimakami, Yuki et al. "Recycling of textile fiber wastes in manufacture of activated carbon", Aichi-ken Sangyo Gijutsu Kenkyusho Kenkyu Hokoku, 2004, pp. 152-153, vol. 3, Mikawa Textile Res. Dent., AITEC, Japan.

Paul T. Williams et al., "High grade activated carbon matting derived from the chemical activation and pyrolysis of natural fibre textile waste", J. Anal. Appl. Pyrolysis 71, 2004, pp. 971-986, Department of Fuel and Energy, Energy & Resources Research Institute, The University of Leeds, Leeds LS2 9JT, UK.

* cited by examiner

PROCESS OF CONVERTING TEXTILE SOLID WASTE INTO GRAPHITE SIMPLE OR COMPLEX SHAPED MANUFACTURE

This application claims the benefit of U.S. provisional application No. 61/479,819, filed Apr. 27, 2011, entitled Sustainable process of converting textile solid waste into graphite simple and complex shape materials, which is incorporated herein by reference in its entirety.

The present description describes the use of textile solid waste, optionally without any virgin textile materials, to produce a graphite manufacture. The description also describes how to convert textile solid waste into a useful graphite manufacture that will eventually make it possible to reduce energy consumption and impact on air, water and land at local, national and global levels.

Textiles are used or consumed by business or individual consumers. At the end of their lives, most of the textiles are collected and either recycled or thrown away as waste.

There are references where the textile wastes are recycled to prepare activated carbon; microporous carbon or carbon matting from natural textile waste; or fibrous material from synthetic fiber waste and a pulverulent adhesive to prepare moldings. Also, there are references in which carbon filaments are made from acrylic precursors, carbon fibers from organic precursors, carbon fabrics from acrylonitrile polymer fibers, and binderless carbon or graphite articles from polymeric materials. There is, however, little information on the graphitization of textile solid waste into graphite materials.

This description describes how to convert textile solid waste, optionally, without virgin materials (materials not yet used or worked for the first time), to make a graphite manufacture rather than the corresponding carbon products or activated carbon. Although subject to many different uses, a graphite manufacture is suitable to be used in, e.g., batteries, such as the Li-ion batteries, lead acid batteries, fuel cells, electrodes, super-capacitors, composites, nuclear reactors and conductive materials. In my findings, I have extended my approach for converting textile solid waste into a useful graphite manufacture. In some embodiments, a micron length graphite fibrous manufacture is produced without using any catalyst or any particular preferred process, such as those required to produce carbon nanotubes fibers or carbon fibers.

Objects and/or advantages of the invention may be set forth in part in the description which follows, and/or in part may be obvious from the description, and/or may be learned by practice of the invention. Some of the objects and advantages of the invention can be realizable and attainable by means of the elements and combinations particularly pointed out in the appended claims.

It is to be understood that both the following detailed description is exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

Each of FIGS. 2A-2C is schematic representation of textile solid waste having a form according to some embodiments described herein.

DESCRIPTION OF EXEMPLARY EMBODIMENTS

Reference will now be made in detail to the exemplary embodiments of the description and examples, some of which are illustrated in the accompanying drawings. Wherever possible, the same reference numbers will be used throughout the drawings to refer to the same or like parts.

The present disclosure describes how to convert textile solid waste into a graphite manufacture. The graphite manufacture is optionally derived from non-virgin (used or worked for at least a first time) natural or synthetic fibers, yarn, or fabric. In some embodiments, after pyrolysis and sintering, the obtained graphite manufacture has a form chosen from powders, sheets, foils, fibers, rectangular or circular structures/articles, pipes, armors, and any given form of simple or complex structures/articles comprising graphite, such as those described herein. In some embodiments, the process described herein makes it possible to ultimately reduce energy consumption and/or environmental pollution. In some embodiments, the process makes it possible to simply make a desired graphite manufacture.

Textile solid waste is readily available from sources such as recycling centers or municipal waste sites. In some embodiments, the textile solid waste has a form chosen from clothing (fabric), furniture, carpets, footwear, towels, sheets, etc.

The process described herein is not alchemy and does not purport to make a graphite manufacture from noncarbon containing textile solid waste. In other words, the term textile solid waste, as used herein, refers to textile solid waste comprising elemental carbon.

In some embodiments, the process includes two steps, namely, (1) an optional preparing process 100 of the textile solid waste and (2) a graphitization process 200 under a pyrolysis/sintering system and a set of conditions.

In some embodiments, textile solid waste comprises natural fiber, organic synthetic fiber, or a mixed type of fiber. In some embodiments, the textile solid waste comprises a natural fiber. In some embodiments, the textile solid waste comprises an organic synthetic fiber.

In some embodiments, the textile solid waste comprises both natural and organic synthetic fibers. In some embodiments, the natural fibers are independently chosen from those prepared from cottons, linens, jutes, wood pulp fibers, kapoks, silks, wools, and hairs. In some embodiments, the organic synthetic fibers are independently chosen from man-made fibers obtainable from organic precursors, such as acrylics, cellulosic polyvinyl alcohols, polyamides, polyimides, polyesters, polybenzimidazoles, cellulose thiourethanes, polyvinyl chlorides, cellulose acetates, etc. In some embodiments, the fibers are cellulosic, such as rayons, acetates, triacetates, and lyocells. In some embodiments, the fibers are non-cellulosic. Of course, textile solid waste, as used herein, is a broad term and is not restricted to the above mentioned precursors of fibers but also includes others precursors from which fibers, yarn, and/or fabric are fabricated.

In some embodiments, the textile solid waste is collected and accumulated until a sufficient quantity is reached. In some embodiments, a sufficient quantity is from 5 to 1000 kg or from 25 to 100 kg or 40 to 85 kg. In some embodiments, a sufficient quantity is from 500 to 12,500 kg or from 2,500 to 10,000 kg or 4,000 to 8,500 kg.

Although the textile solid waste in any form is sufficient to proceed to make a graphite manufacture using the graphitization process 200, varying the quality of the graphite manufacture is obtainable by altering the form of the textile solid waste using one or any of the steps in the preparing process 100 below and in FIG. 1.

Figure 1:
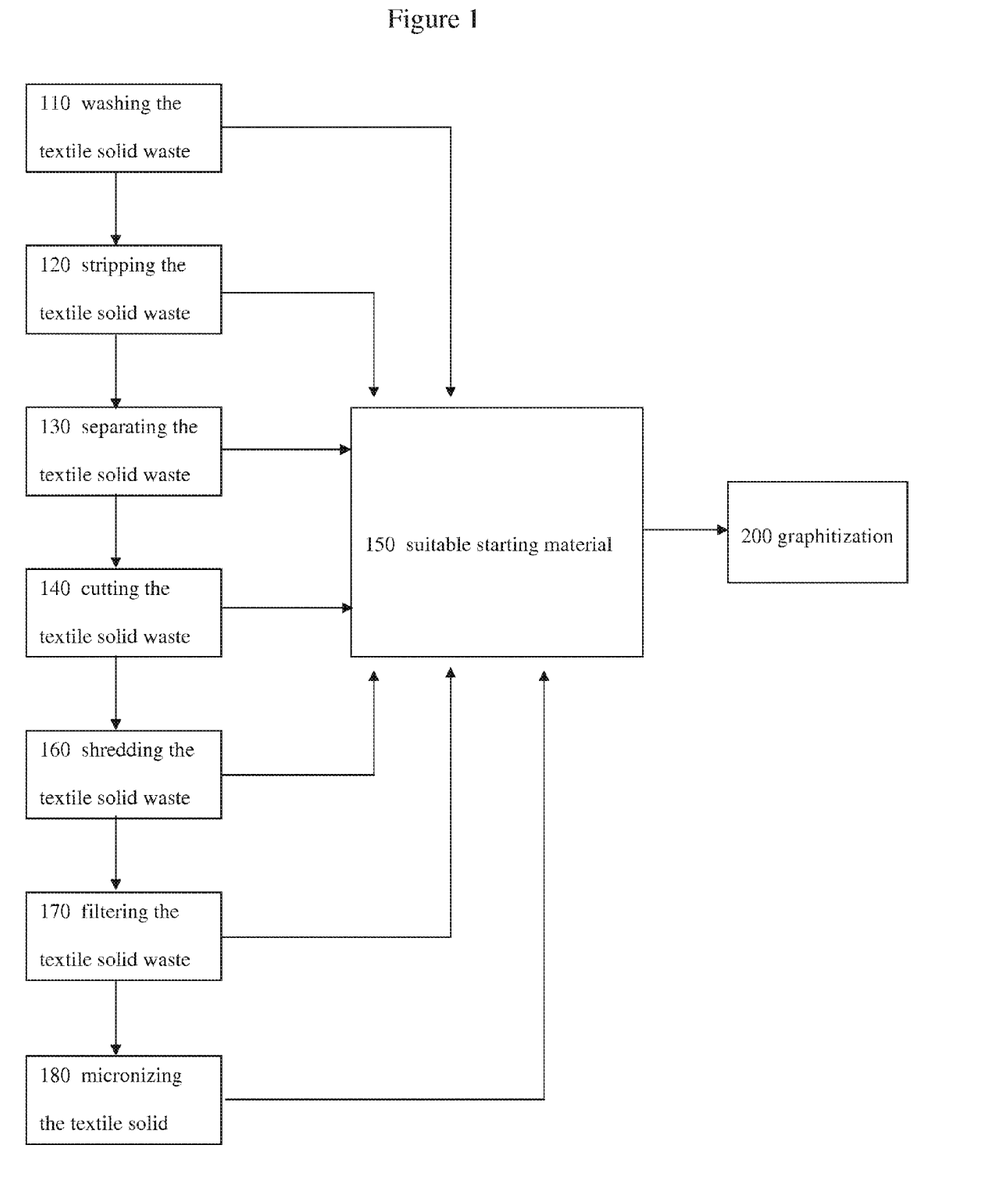
FIG. 1 is a flow chart depicting an optional preparing process according to some embodiments described herein.

In some embodiments, the preparing process 100 involves successive steps, which are depicted in FIG. 1. In some embodiments, the preparing process 100 involves non-successive steps, which are depicted in FIG. 1. In some embodiments, the preparing process 100 involves skipping one or more steps, which are depicted in FIG. 1.

In some embodiments, the textile solid waste is washed, in the washing the textile solid waste step 110, with water to remove dirt attached to the fabrics and thereafter is dried. In some embodiments, the water is tap water. In other embodiments, the water is purified by filtration, sedimentation, flocculation, disinfection, or combinations thereof. In some embodiments, washing 110 includes detergent and/or bleaching agents. Typical detergents include laundry detergents. In some embodiments, the detergent is chosen from anionic, cationic or zwitterionic detergents. In some embodiments, washing 110 includes bleaching agents such as sodium hypochlorite. Drying could be done by "drip-dry" or heating in a drier suitable for the chosen quantity.

In some embodiments, the textile solid waste stripped, in stripping the textile solid waste step 120, of non-carbon-containing or non-textile substances. In some embodiments, these substances include metal, wood, and/or plastics parts. In some embodiments, the wood is stripped by physical force. In some embodiments, the metal is removed (stripped) by chemical reaction/solvation and/or physical force. In some embodiments, the plastic is removed (stripped) by chemical reaction/solvation and/or physical force.

In some embodiments, the textile solid waste is separated, in separating step 130, by an observable property, such as color, nature of the fabric, and/or Denier.

In some embodiments, in separating step 130, the textile solid waste is separated according to color. In some embodiments, colors are sorted by a subset of hue, value, and chroma. In some embodiments, the colors are sorted by whites, colors, or darks.

In some embodiments, in separating step 130, the textile solid waste is separated by the nature of the textile itself. For example, the fabric of the textile solid waste, as noted herein, can comprise natural fiber, organic synthetic fiber, or a mixed type of fiber, and the textile solid waste is separable into one or more sets, e.g., comprising natural fiber or organic synthetic fiber, etc. In some embodiments, the separating is achieved by hand with or without the aid of spectral and/or chemical analysis.

In some embodiments, in separating step 130, the textile solid waste is separated within a range of Denier of the fiber, yarn, and/or fabric of the solid waste. For example, the textile solid waste is separable into one or more sets, e.g., chosen from the following categories: 10 Denier or less (ultra-sheer); 10 to 25 Denier (semi-sheer); 25 to 35 Denier (semi-opaque); and 40 denier or more (opaque). Other separations are possible. In some embodiments, separating is done by hand with or without the use of a measuring device and/or a scale.

In some embodiments, the textile solid waste is cut, in cutting step 140, into a desired shape of a structure or article, such as a rectangle, square, or circle of particular dimension. For example, in some embodiments, the textile solid waste has the shape of the fabric substantially similar to that shown in FIG. 2A. In general, cutting is not restricted to producing a particular shape and any given shape (rectangular, square, circular, and the like). Any form is envisioned. In some embodiments, the cutting 140 is achieved by a cutting tool having one or more blades sufficient to produce fibrous sheds, fabric dust, and cut pieces of fabric. In some embodiments, cutting 140 produces a primarily cut pieces of fabric. The cut pieces of fabric are a suitable starting material 150 in the process of graphitization 200 to obtain a graphite manufacture, such as a foil, a sheet or other article, such as those described herein.

Figure 2:
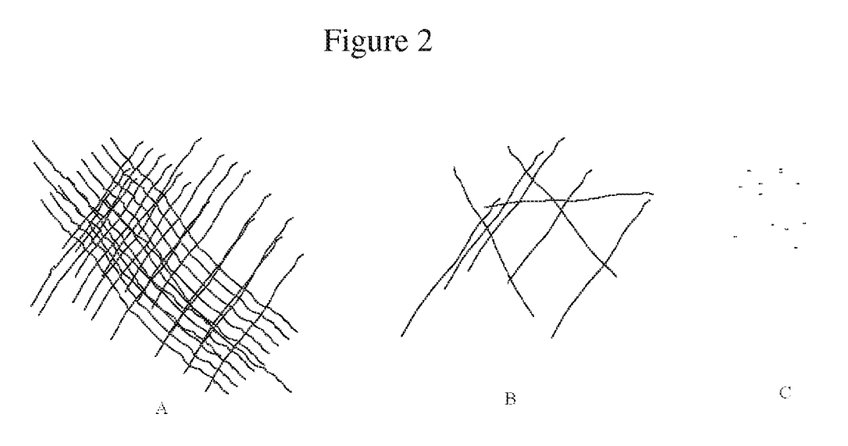

In some embodiments, the solid textile waste, optionally having a form of cut pieces of fabric, is shredded, in shredding step 160, to obtain open length fibers, optionally having a substantially uniform length as shown, e.g., in FIG. 2B. In some embodiments, the shredding 160 is achieved by a commercial fabric shredder. In some embodiments, the substantial uniform length is noticeable by a sample of open fibers having a length distribution of ±0 to 2 standard deviations (assuming a normal distribution). In this case, the sample of open fibers appears substantially uniform in length to an observer. In some embodiments, the result is primarily a fiberous shred of open fibers and fabric dust, such as that illustrated in FIG. 2C. In some embodiments, the fiberous shred of open fibers is a suitable starting material 150 in the process of graphitization 200 to obtain a graphite manufacture, such as graphite fibers or other graphite articles, such as those described herein.

In some embodiments, the fabric dust is a suitable starting material 150 in the process of graphitization 200 to obtain a graphite manufacture, such as grains or powders or other articles, such as those described herein.

In some embodiments the suitable starting material 150 is or comprises open fibers and/or cut pieces of fabric having an average length ranging from 0.1 to 5 mm. In some embodiments, the average length ranges from 1 to 3 mm. In some embodiments, the standard deviation length of the component parts of the suitable starting material 150 has a value ranging from ±5% to ±10% of the average length such that the suitable starting material 150 appears to have a substantially uniform length to an ordinary observer.

In some embodiments, the open fibers and fabric dust are separated, in filtering step 170, before the graphitization process 200. In some embodiments, the removal is achieved by mesh filtration capturing the textile solid waste, e.g., in raw form or in the form of cut pieces and/or open fibers, but passing the fabric dust.

In some embodiments, in micronizing step 180, the shredded open fibers and/or the fibrous dust are sheared into micron size particles. In some embodiments, the shearing is done by attritor/ball milling.

In some embodiments, the micron size particles range from an average size of 1 to 100 µm. In other embodiments, the range is from 10 to 75 µm or 25 to 50 µm. In some embodiments, the fabric dust is a suitable starting material 150 in the process of graphitization 200 to obtain a graphite manufacture, such as grains or powders or other articles, such as those described herein.

In some embodiments, the starting material 150 is fabric dust having an average size being micron size particles. In some embodiments, the fabric dust has micron size particles have an average size ranging from 1 to 100 μm. In other embodiments, the range is from 2 to 20 μm or 10 to 75 μm or 25 to 50 μm. In some embodiments, the D90 value for the micron size particles ranges from 0.2 to 60 μm. In other embodiments, the D90 range is from 6 to 40 μm or 14 to 30 μm.

As apparent herein, in some embodiments, the textile solid waste is free from a virgin textile material.

In some embodiments, one may want to form a composite material structure form of the graphite manufacture. Such composite material structures are obtained by adding at least one other element or a precursor thereof to the textile solid waste. In some embodiments, the at least one other element is chosen from Al, Si, W, Mo, Cr, Ru, Cu, Ti, Zr, and B. In some embodiments, the precursor is chosen from salts and oxides of the at least one other element, e.g., those mentioned elsewhere. In some embodiments, the at least one element or precursor thereof is in the form of a micron or nanostructured element. In some embodiments, the target percent of the at least one other element facilitates making a particular composite, e.g., including carbon and at least one compound comprising the at least one other element, e.g., WC, BC, TiC, ZrC, and $Al_2O_3$. In some embodiments, the at least one compound is chosen from oxides. In some embodiments, the composite comprises carbon and at least two elements.

Also, as apparent herein below, in some embodiments, the graphitization process 200 is free from catalyst.

In some embodiments, the suitable starting material 150, e.g., the physically prepared fabric are cut into either pieces having a substantially uniform length or micron particles, is subjected to a graphitization process 200. In the graphitization process 200, the suitable starting material 150 form of textile solid waste is optionally pyrolyzed and sintered under a high temperature, at a given vacuum or pressure, and in a gas environment. In some embodiments, the graphitization process further comprises facilitating graphitization via an electrical current. In some embodiments, the fiber or particle chemical or bulk properties, the temperature, gas environment, pressure, and electrical current are varied depending upon a desired resultant manufacture.

In the graphitization process 200, the textile solid waste is pyrolysed/sintered under a high temperature. In some embodiments, the pyrolysis/sintering temperature range from 1500 to 3000° C. In some embodiments, the temperature ranges from 1600 to 3000° C. or from 2500 to 3000° C. Indeed, these temperatures differ significantly from those required to form simple carbon or activated carbon (500 to 1000° C.).

In some embodiments, the rate of heating from a starting temperature to the pyrolysis/sintering temperature ranges from 0.1 to 700° C./minute. Suitable heating rates are chosen depending upon the heating system or the resultant graphite manufacture that is to be obtainable from the textile solid waste. In some embodiments, e.g., the rate of heating ranges from 1 to 100° C./minute or from 5 to 50° C./minute or from 10 to 40° C./minute. In some embodiments, the rate of heating ranges from 200 to 700° C./minute or from 350 to 500° C./minute.

In the graphitization process 200, the textile solid waste is pyrolysed/sintered at a given pressure and/or in a vacuum condition. In some embodiments, the vacuum ranges from $5 \times 10^{-6}$ to 300 mbar. In some embodiments, the vacuum ranges from $8 \times 10^{-6}$ to 0.5 mbar or from $30 \times 10^{-6}$ to 0.3 mbar. In some embodiments, the gas pressure ranges from 1 to 300 bar or from 30 to 200 bar.

In the graphitization process, the textile solid waste is pyrolysed/sintered in a gas environment. In some embodiments, the gas environment differs in composition from air. For example, air is taken under vacuum for a period of time and under conditions sufficient to substantially reduce or totally eliminate the oxygen content for vacuum sintering. In some embodiments, the gas environment comprises a gas chosen from air, hydrogen, helium, argon, and other inert gases, nitrogen, and methane for gas pressure sintering. In some embodiments, the gas is argon or nitrogen or a mixture of argon and nitrogen. In some embodiments, the gas is methane or a mixture of methane and argon.

In some embodiments, pyrolysis is preformed to decompose the textile solid waste. In some embodiments, pyrolysis is performed in a temperature ranging from 100 to 700° C. or from 200 to 600° C. or from 300 to 500° C. In some embodiments, the rate of heating from a starting temperature to the pyrolysis temperature ranges from 0.1 to 10° C./minute or from 0.3 to 7° C./minute or from 0.5 to 4° C./minute. Suitable heating rates are chosen depending upon the heating system or the resultant graphite manufacture that is to be obtainable from the textile solid waste. For an example, the rate of pyrolysis makes it possible to maintain the structure and avoid melting of the particles/fibers in the textile sold waste as the particles/fibers are destroyable if the rate of heating is too high, as there is an evolution of gases such as CO, $CO_2$ and other gases from the particles/fibers sufficient to burst the structure and therefore destroy the particles/fibrous nature.

In some embodiments, the graphitization process 200 comprises applying a pressing force to the textile solid waste. In some embodiments, the pressing force ranges from 1 to 100,000 kN. In some embodiments, the pressing force ranges from 25 to 50 kN or from 50 to 250 kN or from 1,000 to 3,000 kN or from 250 to 5000 kN.

In some embodiments, the graphitization process 200 comprises applying an electrical current to the textile solid waste. For example, in some embodiments, the electrical current is a DC electrical current. In some embodiments, the DC electrical current has a power ranging from 1 to 2000 kW per pulse, which typically lasts from 1ms to 300 ms or from 15 to 100 ms or from 150 to 200 ms. In some embodiments, the power ranges from 15 kW to 180 kW per pulse or from 360 to 1000 kW per pulse.

In some embodiments, the graphitization process 200 occurs in a pyrolysis/sintering system chosen taking into consideration the above parameters and the desired end graphite manufacture. In some embodiments, the sintering system is chosen from vacuum sintering systems, gas pressure sintering systems, hot press (HP) sintering systems, and field assisted sintering technique (FAST) systems.

In general, the pyrolysis/sintering system is not restricted to any particular size or model described herein. In some embodiments, the system is used to obtain a desired manufacture at different conditions.

In some embodiments, a vacuum sintering system is used to obtain graphitized fibers, particles, and/or different shaped articles from textile solid waste.

Figure 3:
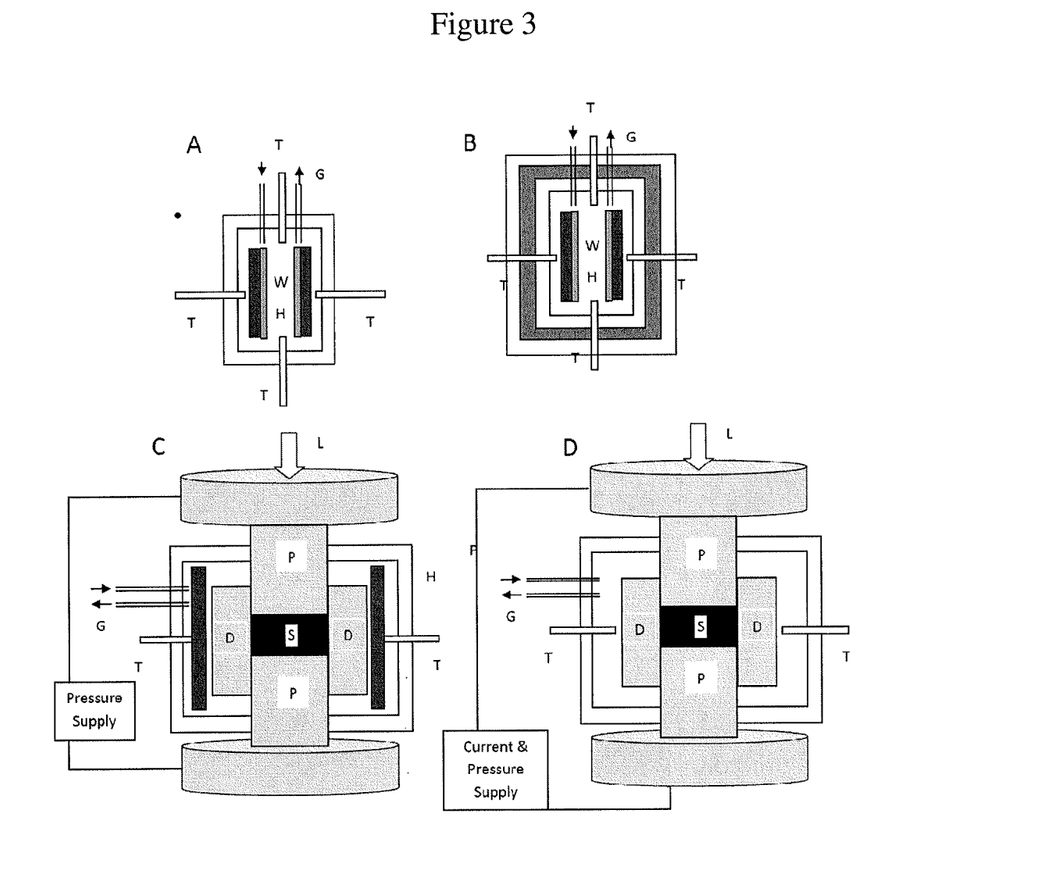
FIG. 3 is a schematic diagram of graphitization process according to some embodiments described herein.

FIG. 3A is a schematic cross sectional view of a Vacuum Sintering System. The center region has a working area W, e.g., for the textile solid waste, which is in proximity to heating element H. The system has thermocouples/pyrometers T, and is equipped with gas inlet/outlet G.

Suitable vacuum sintering systems include but are not limited to the Astro series, which are obtainable from Thermal Technology LLC. In some embodiments, a temperature ranging from 1500 to 3000° C. is applied under a vacuum pressure ranging from 5×10 to 1 mbar. In some embodiments, the vacuum is held for a period of time sufficient to substantially reduce or eliminate the oxygen from the heating chamber. In some embodiments, the textile sold waste comprises open fibers having an average length ranging from 0.1 to 5 mm. In some embodiments, the textile solid waste is fabric dust having an average size ranging from 1 to 100 μm. The textile solid is then graphitized, e.g., to obtain fibrous or particle graphite manufacture. Optionally, the textile solid waste is stacked according to a chosen thickness and shape and then mechanically compressed with a pressure ranging from 1 to 400 bar for a period of time and under conditions sufficient to achieve different shaped forms. Each of the fibrous, particles and optionally shaped textile solid waste is then graphitized in the vacuum sintering system under the chosen conditions to obtain fibrous, particles and different shaped articles.

In some embodiments, a gas pressure sintering system is used to obtain graphitized fibers, particles, and different shaped articles from textile solid waste.

FIG. 3B is a schematic cross sectional view of a Gas Pressure Sintering System. The center region has a working area W, e.g., for the textile solid waste, which is in proximity to heating element H. The system has thermocouples/pyrometers T, and is equipped with gas inlet/outlet G.

Suitable gas pressure sintering systems include but are not limited to FPW Series, FCT. In some embodiments, a temperature ranging from 1500 to 3000° C. is applied under a pressure ranging from 1 to 300 bar. In some embodiments, the gas environment is argon, nitrogen, hydrogen, methane or mixtures thereof. In some embodiments, the textile solid waste comprises open fibers having an average length ranging from 0.1 to 5 mm. In some embodiments, the textile solid waste comprises fabric dust having an average size ranging from 1 to 100 μm. The textile solid waste is then graphitized to get fibrous or particle graphite manufacture. Optionally, the textile solid waste is stacked according to a chosen thickness and shape and then mechanically compressed with a pressure ranging from 1 to 400 bar for a period of time and under conditions sufficient to achieve different shaped forms of the textile solid waste. The optionally different shaped textile solid waste is then graphitized in the gas pressure sintering system under the chosen conditions to obtain a desired article.

In some embodiments, a hot press sintering system is used to obtain graphitized textile solid waste. FIG. 3C is a schematic cross sectional view of a Hot Press Sintering System. Sample S is, e.g., the textile solid waste, which is flanked from above and below by punches P, and which is flanked on either side by die D. The system is configured to accept a pressure load L. The system has thermocouple/pyrometer T, a heating element H, and is equipped with a pressure supply and gas inlet/outlet G.

Suitable hot press sintering systems include but are not limited to Engineered Pressure System International N.V. EPSI, FCT System, and from Thermal Technology LLC. In some embodiments, a temperature ranging from 1500 to 3000° C. is applied under a high load force ranging from 50 to 10,000 kN in a vacuum atmosphere ranging from 5×10 to 1 mbar. In some embodiments, a temperature ranging from 1500 to 3000° C. is applied under a high load force ranging from 50 to 10,000 kN in an over pressure inert atmosphere ranging from 1 to 20 bar. In some embodiments, the gas environment is argon, nitrogen, or mixtures thereof. In some embodiments, the textile solid waste is optionally stacked according to a chosen thickness and shape and then mechanically compressed with a force ranging from 50 to 10,000 kN for a period of time and under conditions sufficient to achieve different shaped forms. For example, simple shape like rings, rectangular/square plates, blocks, pipes/cylinders, armors, and sheets/foil are produced. For another example, more complex structures are obtained from a form depending upon a design of pressing dies.

Similarly, the graphite manufacture is in the form of a composite material structure, which is obtainable by adding at least one other element or a precursor thereof. In some embodiments, the at least one other element is chosen from Al, Si, W, Mo, Cr, Ru, Cu, Ti, Zr, and B. In some embodiments, the precursor is chosen from salts and oxides of the at least one other element, e.g., those mentioned elsewhere. In some embodiments, the at least one element or precursor thereof is in the form of a micron or nanostructured element. In some embodiments, the target percent of the at least one other element facilitates making a particular composite, e.g., including carbon and at least one compound comprising the at least one other element, e.g., WC, BC, TiC, ZrC, and $Al_2O_3$. In some embodiments, the at least one compound is chosen from oxides. In some embodiments, the composite comprises carbon and at least two elements. The optionally different shaped textile solid waste, at least one other element, and/or precursor thereof are then graphitized in the hot press sintering system under the chosen conditions to obtain a desired manufacture.

In some embodiments, a FAST system is used to obtain a graphitized manufacture. FIG. 3D is a schematic cross sectional view of a Field Assisted Sintering Technique System. Sample S is, e.g., the textile solid waste, which is flanked from above and below by punches P, and which is flanked on either side by die D. The system is configured to accept a pressure load L. The system has thermocouple/pyrometer T, and is equipped with a DC current, pressure supply and gas inlet/outlet G.

Suitable FAST systems include but are not limited to FAST/SPS Series, FCT, SPS/DCS Series, which are obtainable from Thermal Technology LLC. In some embodiments, a temperature ranging from 1500 to 3000° C. is applied under a high load force ranging from 50 to 10,000 kN. In some embodiments, a repetitive pulse of DC current having a power ranging from 25 to 1,000 kW and an on/off pulse ranging from 1 ms to 255 ms is applied. In some embodiments, the graphite manufacture is in the form of a composite material structure, which is obtainable by actively added at least one other element or a precursor thereof. In some embodiments, the at least one other element is chosen from Al, Si, W, Mo, Cr, Ru, Cu, Ti, Zr, and B. In some embodiments, the precursor is chosen from salts and oxides of the at least one other element, e.g., those mentioned elsewhere. In some embodiments, the at least one element or precursor thereof is in the form of a micron or nanostructured element. In some embodiments, the target percent of the at least one other element facilitates making a particular composite, e.g., including carbon and at least one compound comprising the at least one other element, e.g., WC, BC, TiC, ZrC, and $Al_2O_3$. In some embodiments, the at least one compound is chosen from oxides. In some embodiments, the composite comprises carbon and at least two elements. The optionally different shaped textile solid waste, at least one other element, and/or precursor thereof are then graphitized in the FAST sintering system under the chosen conditions to obtain a desired manufacture.

In some embodiments, the graphitized manufacture is ground to obtain a specific size powder. In some embodiments, the size powder has an average size being micron size particles. In some embodiments, the size powder has an average size ranging from 1 to 100 µm. In other embodiments, the range is from 2 to 20 µm or 10 to 75 µm or 25 to 50 µm. In some embodiments, the D90 value for the micron size particles ranges from 0.2 to 60 µm. In other embodiments, the D90 range is from 6 to 40 µm or 14 to 30 µm.

Although subject to many different uses, a graphite manufacture is suitable to be used in, e.g., batteries, such as the Li-ion batteries (including, e.g., graphite anodes, graphite-Silicon anodes, and graphite-Sulfur anodes), lead acid batteries (including, e.g., additives), fuel cells, electrodes, supercapacitors, composites, nuclear reactor parts, and conductive materials.

In some embodiments, the graphite manufacture is further processed to form an adsorption composite. The adsorption composite, in some embodiments, comprises at least one element chosen from transition elements and even elements such as Si, S, and Pb. In some embodiments, the at least one element is lead oxide or lead sulfate. In some embodiments, the at least one element is chosen from ruthenium, rhodium, palladium, silver, osmium, iridium, platinum, and gold. In some embodiments, the at least one element is platinum, lead oxide, or lead sulfate.

The adsorption composite is, in some embodiments, formed by forming an adsorbate with the graphite manufacture. In some embodiments, forming the adsorbate is via a physical process, like milling, or chemical process, like solvent evaporation to leave a film or particles on adsorbent graphite manufacture.

Examples of adsorption composites include, e.g., Si/graphite manufacture, S/graphite manufacture, PbO/graphite manufacture, $PbSO_4$/graphite manufacture, and Pt/graphite manufacture. In some embodiments, the graphite manufacture in the Pt/graphite manufacture is in the form of fibers. In some embodiments, the graphite manufacture in the Si/graphite manufacture, S/graphite manufacture, PbO/graphite manufacture, $PbSO_4$/graphite manufacture, or Pt/graphite manufacture is a powder.

In some embodiments, the graphite manufacture or adsorption composite is mixed with a binder. In some embodiments, the binder is chosen from polyvinylidene fluoride (PVDF) and carboxymethylcellulose (CMC).

Example 1

Figure 4:
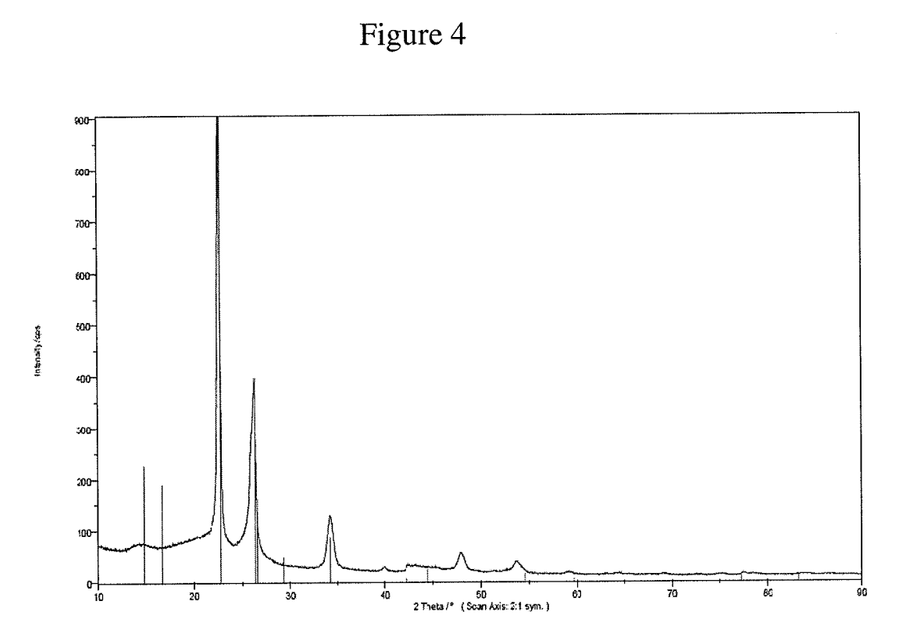
FIG. 4 is an XRD (X-ray Diffraction) diffraction pattern of a graphite manufacture produced according to some embodiments described herein.
Figure 5:
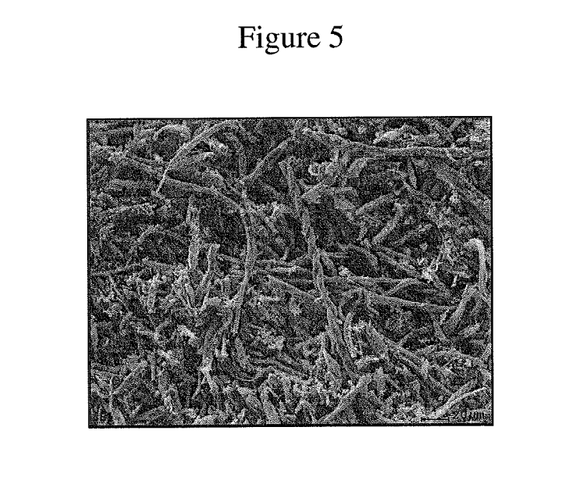
FIG. 5 is an SEM (Scanning electron microscope) pictures showing the fibrous structures of a graphite manufacture produced according to some embodiments described herein.

Graphitization of Textile Waste 400 gm of pure cellulose cotton waste fabric was heated in an induction furnace at 2500° C. in an inert atmosphere (Ar, $N_2$) of 1 bar pressure of Ar gas. Before heating the sample, the furnace containing the sample was vacuumed at $10^{-3}$ mbar to remove oxygen. The pyrolysis of the graphitization process is carried for 6 hours. Then the furnace was allowed to cool. The pyrolysis of cellulose cotton yield a graphite manufacture, the XRD (X-ray Diffraction) diffraction pattern matches well with the 411487 Graphite 2H pattern. See FIG. 4. The EDS (Energy-dispersive X-ray spectroscopy) spectrum showed that the graphite manufacture is pure carbon allotrope graphite without unwanted impurities. The SEM (Scanning electron microscope) pictures showed the fibrous structures of the graphite manufacture. See FIG. 5. The yield is 30% of the total amount of starting material by weight. The SEM picture was generated after the fabric was ground with a mortar and pestle.

Example 2

Behavior of Graphite Anode in Li-ion Battery

In this example, vacuum/pressure sintering system is used to graphitize textile solid waste. The temperature in the range of 2200 to 3000° C., and the system is applied under vacuum between ranging from $5 \times 10^{-6}$ to 1 mbar and under inert atmosphere (Ar gas).

In order to investigate the behavior of graphite material produced from textile waste as anode in Li-ion battery, electrochemical measurements of graphite-Li metal half cells were carried out using an Arbin model BT 2000 computerized multichannel battery cycler. Coin-type cells with standard 2325 parts from NRC Canada were used. The composite graphite electrode includes 75-95% active mass, 5-15% PVdF (Aldrich, Cat. #182702) binder, and 0-15% carbon black, coated onto a copper foil (Strem Chemical, 99.9% pure) current collector. The electrode was prepared by spreading a slurry of the above three components in N-methyl-pyrrolidone on the copper foil using doctor blade, followed by pressing and drying in a vacuum oven (100° C., $10^{-2}$ mm Hg). The coin-type cells were assembled with disc-shaped composite graphite electrodes, metallic lithium disc counter electrodes, and a porous polypropylene separator (Celgard 3501, 25 µm thickness, 55% porosity) soaked with the selected electrolyte solutions. Suitable solvents include EC=Ethylene carbonate, DMC=Di-Methyl carbonate, EMC=Ethyl Methyl carbonate, DEC=Di-Ethyl carbonate, BL=γ-butyrolactone, VC=Vinylene carbonate, etc. and salt $LiPF_6$, LiBOB, LiTFSI, LiFSI and etc. for the preparation electrolyte solution.

In this test EC:DMC 1:1 V/V with 1M $LiPF_6$ electrolyte solution is used and, before all experiment, the cell was given enough time to allow complete wetting of the electrode coatings by the electrolyte solution. The cells were further sealed with epoxy resin around their gaskets (on top of the coin cell) in order to ensure a hermetic isolation of the active components from atmospheric contaminants. In a typical set of experiments, charge/discharge capacity measurements were first performed on the cells at 30° C., with galvanostatic cycling between 3 and 0.05 V potential limits, and at a current density corresponding to a C/20 h rate.

Figure 6:
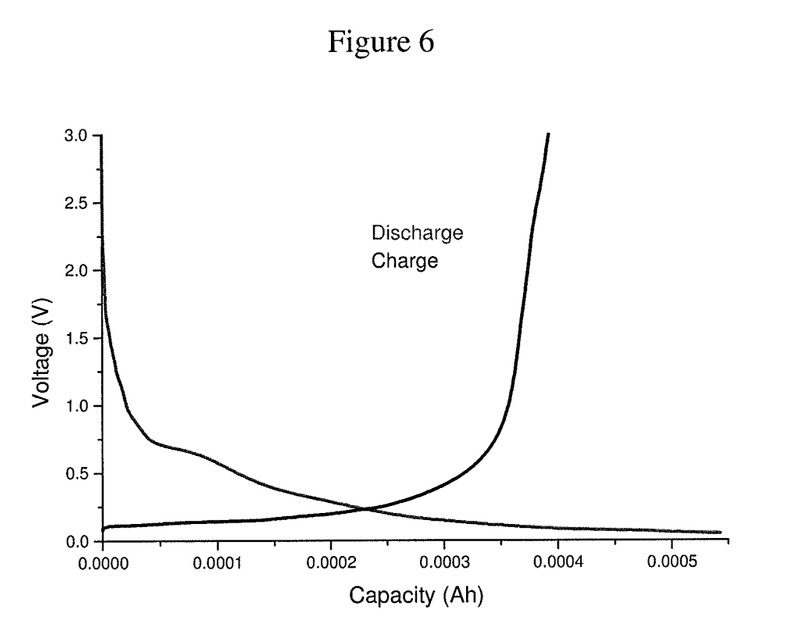
FIG. 6 is a voltage profile for coin type cell at C/20 rate, room temperature 30° C., for graphite manufacture produced from textile solid waste.

A typical voltage profile is presented in FIG. 6. The irreversible capacity for first cycle is 27% which is quite comparable with commercial sample, reference *Journal of The Electrochemical Society*, 157 (12) A1383-A1391, 2010.

Graphite as anode in Li-ion battery is the most researched material in the history of battery industry. Mostly all the petrochemical industry and coal mining companies are involved to produce anodic graphite and conductive carbon for Li-ion batteries. The graphite materials used are synthetic or natural grades in Li-ion batteries. Synthetic Graphite is manufactured from calcined petroleum cokes e.g. MCMB (mesophase carbon microbeads). Natural Graphite is obtained by mining process.

The textile solid waste is converted into useful graphitic grade material through pyrolysis/graphitization process. The material that is obtainable, e.g., in the form of miron size particles or individual fibers of a graphitic nature. In some embodiments, this material is then combined with Silicon (Electrochimica Acta 51 (2006) 4994-5000) or sulfur (*Adv. Mater.* 2011, 23, 5641-5644) with suitable binder such as PVDF (poly vinylidene fluoride) and CMC (carboxy methyl cellulose) to form electrodes that are useable as anode in Li-ion batteries.

The test results in the example above show a glavanostatic activity which is very similar to that of the commercial material. It is worthy to say that the fibers nature of the graphite manufacture increases the conductivity due to the network formation of the fibers. Hence, textile solid waste converted into a graphite manufacture is sufficient to work well in coin type cells.

Example 3

Figure 7:
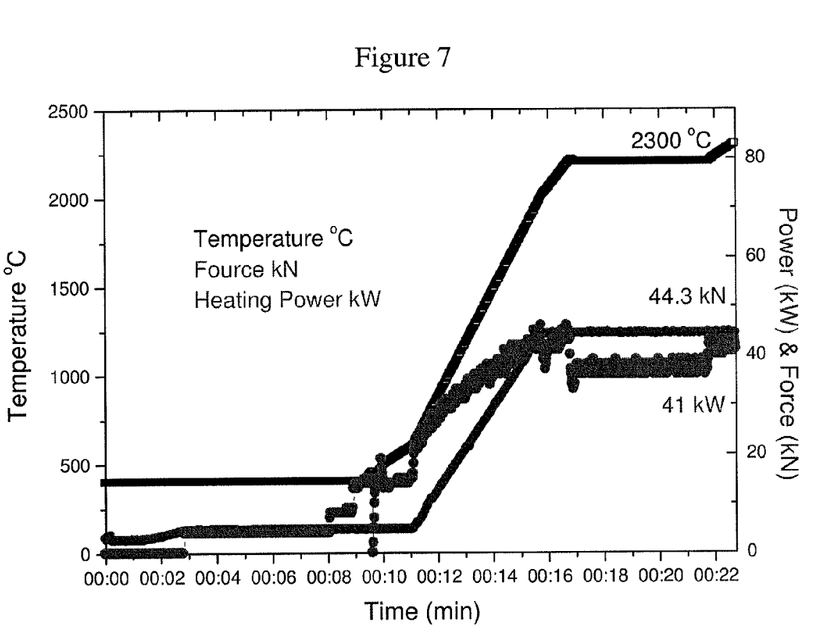
FIG. 7 is an applied force, power, and temperature plot of a FAST experiment using a powder material acquired from textile solid waste.
Figure 8:
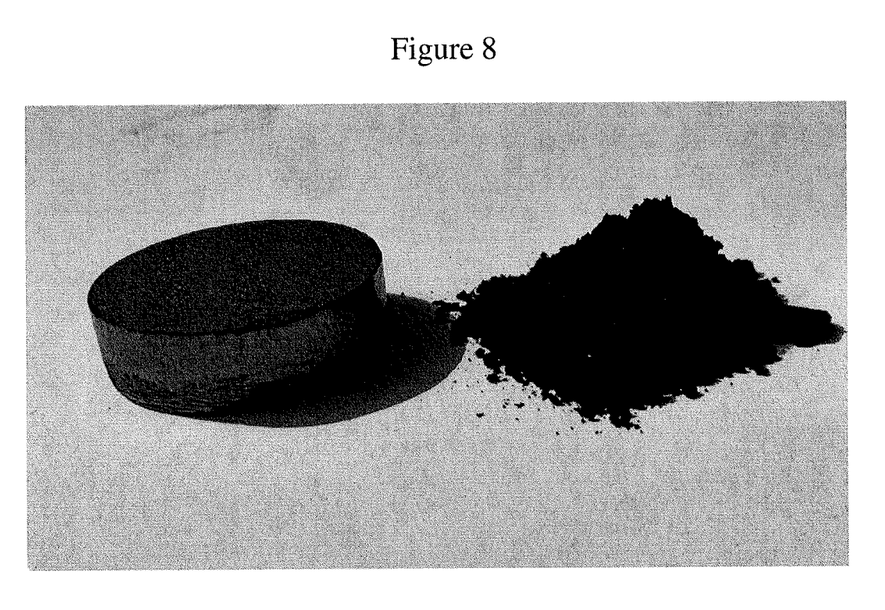
FIG. 8 is a 30 mm $\phi$ disc form of a graphite manufacture obtained from powder in FAST system.

FAST Experiment 10 grams of pre-pyrolyzed powder textile solid waste material in the form of individual open fibers and particles were used for FAST experiment. The powder was treated under heating power of 45 kW with applied force of 45 kN and temperature about ~2300° C. in a 30 φ die of FAST system. Under these condition the disc of 30 φ was produced the density that was obtained in this condition was 1.48 g/cm$^3$ with 25% porosity reference with 2 g/cm$^3$ graphite, higher density and different shapes can be achieved under suitable force, direct current or direct current in the form of pulse and higher temperature using simple and complex shape dies. The applied force, power and temperature plot with respect to time in FAST experiment is shown in FIG. 7. The disc produced (left) from powder material (right, batch left over) is shown in the FIG. 8.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of converting textile solid waste into a graphite manufacture, comprising subjecting textile solid waste to a preparing process comprising:
   washing the textile solid waste;
   stripping the textile solid waste of non-carbon-containing or non-textile substances;
   separating the textile solid waste by at least one observable property chosen from color, nature of the fabric, and denier;
   cutting the textile solid waste;
   shredding the textile solid waste;
   filtering the textile solid waste; and
   micronizing the textile solid waste; and thereafter,
   subjecting textile solid waste to a graphitization process under a pyrolysis/sintering system and a set of conditions in which sintering is at a temperature 1500 to 3000° C. and in which at least one other conditions is chosen from
   sintering at a pressure ranging from 1 to 300 bar;
   sintering at a vacuum ranging from 5×10$^{-6}$ to 300 mbar;
   sintering while applying, to the textile solid waste, a pressing force 1 to 100,000 kN; and
   applying, to the textile solid waste, an electrical current having a power ranging from 1 to 2000 kW per pulse.

2. The method of claim 1, wherein the textile solid waste has a form chosen from clothing, furniture, carpets, footwear, towels, and sheets.

3. The method of claim 1, wherein the textile solid waste comprises both natural and organic synthetic fibers.

4. The method of claim 1, wherein the textile solid waste comprises at least one natural fiber chosen from fibers prepared from cottons, linens, jutes, wood pulp fibers, kapoks, silks, wools, and hairs.

5. The method of claim 1, wherein the textile solid waste comprises at least one organic synthetic fiber chosen from acrylics, cellulosic polyvinyl alcohols, polyamides, polyimides, polyesters, polybenzimidazoles, cellulose thiourethanes, polyvinyl chlorides, and cellulose acetates.

6. The method of claim 1, wherein the textile solid waste comprises at least one cellulosic fiber chosen from rayons, acetates, triacetates, and lyocells.

7. The method of claim 1, wherein the graphite manufacture is in the form of a composite material structure obtained by adding at least one other element or a precursor thereof to the textile solid waste.

8. The method of claim 7, wherein the at least one other element is chosen from Al, Si, W, Mo, Cr, Ru, Cu, Ti, Zr, and B.

9. The method of claim 7, wherein the precursor is chosen from salts and oxides of the at least one other element.

10. The method of claim 1, wherein the graphitization process is free from a catalyst.

11. The method of claim 1, wherein, for the graphitization process, the pyrolysis/sintering system is chosen from vacuum sintering systems, gas pressure sintering systems, hot press (HP) sintering systems, and field assisted sintering technique (FAST) systems.

12. The method of claim 1, wherein, for the graphitization process, the pyrolysis/sintering system is chosen from vacuum sintering systems, and wherein set of conditions comprises sintering at a vacuum ranging from 5×10$^{-6}$ to 300 mbar.

13. The method of claim 1, wherein, for the graphitization process, the pyrolysis/sintering system is chosen from gas pressure sintering systems, and wherein set of conditions comprises sintering at a pressure ranging from 1 to 300 bar.

14. The method of claim 1, wherein, for the graphitization process, the pyrolysis/sintering system is chosen from hot press (HP) sintering systems, and wherein set of conditions comprises sintering while applying, to the textile solid waste, a pressing force 1 to 100,000 kN.

15. The method of claim 1, wherein, for the graphitization process, the pyrolysis/sintering system is chosen from field assisted sintering technique (FAST) systems, and wherein set of conditions comprises applying, to the textile solid waste, an electrical current having a power ranging from 1 to 2000 kW per pulse.

16. The method of claim 1, wherein the graphite manufacture is in the form of a composite material structure obtained by adding at least one other element or a precursor thereof to the textile solid waste;
   wherein the at least one other element is chosen from Al, Si, W, Mo, Cr, Ru, Cu, Ti, Zr, and B; and
   wherein the precursor is chosen from salts and oxides of the at least one other element.

17. The method of claim 1, further comprising:
   forming an adsorbate on the graphite manufacture via a physical process or chemical process;
   wherein the adsorbate includes at least one element chosen from transition elements, Si, S, and Pb.

* * * * *